Patented June 26, 1934

UNITED STATES PATENT OFFICE 1,964,376

MANUFACTURE OF BENZANTHRENE

Carl Wulff, Ernst Roell, and Artur Krause, Ludwigshafen-on-the-Rhine, Germany, assignors to General Aniline Works, Inc., New York, N. Y., a corporation of Delaware No Drawing. Application August 31, 1933, Serial No. 687,730. In Germany September 8, 1932

4 Claims. (Cl. 260—168)

The present invention relates to the manufacture of benzanthrene.

When heating alpha-benzyl-naphthalene at high temperatures, benzanthrene is obtained with the formation of a new ring, but the yields thus obtainable are very bad because a large proportion of the alpha-benzylnaphthalene is decomposed into benzene, toluene, naphthalene, methyl-naphthalene and the like.

We have found that very good yields of benzanthrene are obtained by passing alpha-benzyl-naphthalene through a reaction space heated at temperatures between about 650° and about 800° C. while maintaining a definite throughput, i. e. amount of alpha-benzyl-naphthalene passed through the reaction space.

The throughput (D) per unit of time to be used amounts to from 1 to 4 times a minimum throughput ($D_{min}$) which satisfies the following equation in its dependence on the reaction space (V) which is heated to a temperature ($t$ in degrees C.):—

$$D_{min} = \frac{V}{16} \cdot 2^{\frac{t-650}{25}}$$

In this equation, the throughput D is expressed in grams per hour, of the reacting substance (benzyl naphthalene) the volume V of the reaction chamber in cubic centimetres.

Some examples of the maximum and minimum amounts of alpha-benzylnaphthalene which may be passed through the reaction chamber V at a given temperature in accordance with the above formula are given in the following table:—

| Temperature °C. | Throughput | |
|---|---|---|
| | Minimum | Maximum |
| 750 | 1V | 4V |
| 725 | ½V | 2V |
| 700 | ¼V | 1V |
| 675 | ⅛V | ½V |
| 650 | ¹⁄₁₆V | ¼V |

Thus, for example, with a volume of the reaction chamber of 1000 cubic centimetres, the throughput at 750° C. may be between 1000 grams and 4000 grams of benzyl naphthalene per hour.

The process may be carried out for example by passing the vapors of alpha-benzylnaphthalene in the amounts corresponding to the above equation through an empty reaction chamber heated to a temperature of from 650° to 800° C. The vapors may also be led under the said conditions over known dehydrogenation catalysts. In this case, V in the equation represents the volume of the reaction chamber heated to the reaction temperature, without regard to the volume of the catalyst. As catalysts may be mentioned those which consist of oxides or compounds of the alkaline earth metals and aluminium and non-volatile oxides and compounds, which are not reducible to metals under the working conditions, of elements which occur in several stages of valency such as molybdenum trioxide, tungsten trioxide, chromium trioxide, vanadium pentoxide, etc. and which catalysts have previously been coated with lustrous carbon if desired. As constructional materials for the reaction vessel porcelain, quartz and metals or alloys which cause no deposition of carbon, as for example copper, brass, manganese-copper and highly alloyed steels, as for example chromium nickel steels, are suitable. The latter are preferably first superficially rendered passive with a thin layer of sulphide by treatment with hydrocarbons containing sulphur in order to exclude any deposition of carbon. Alternatively, the materials may be provided with a protective coating of a neutral enamel. Reaction vessels which are only lined with the materials described above may also be employed.

The reaction chamber may also be filled with fillers, as for example with quartz, pieces of coke, graphite, or rings of the said metals.

It has been found to be preferable to employ diluent gases or vapors which do not react, or only react to a subordinate degree, with the benzyl-naphthalene, such as nitrogen, carbon dioxide, water vapor or methane. The reaction may be carried out under ordinary or under reduced pressure.

The following examples will further illustrate the nature of this invention but the invention is not restricted to these examples.

Example 1

As many grams of vaporized alpha-benzyl-naphthalene are led per hour through a tube of manganese-copper heated to 720° C. as there are cubic centimetres of volume in the tube maintained at the reaction temperature ($D=V$). Nitrogen is employed as a diluent in an amount equal to 0.4 of the volume of the vaporized benzyl-naphthalene. The vapors leaving the manganese-copper tube are condensed. The nitrogen together with the hydrogen formed by the dehydrogenation is charged through a strongly cooled receiver in order to recover the remainder of the conversion products contained therein. The condensate is subjected to a fractional distillation, a first running of benzene, toluene, naphthalene and its homologues and unchanged alpha-benzylnaphthalene being obtained under a pressure of 4 millimetres of mercury and then benzanthrene and dihydrobenzanthrene at from 200° to 220° C. The amount of benzylnaphthalene converted by a single passage through the tube amounts to about 56 per cent of which about 39 per cent consists of benzanthrene and 17 per cent of cleavage products and higher condensation products. The total yield of benzanthrene, calculated with reference to the benzyl-naphthalene converted, is thus about 69 per cent.

*Example 2*

Vaporized alpha-benzylnaphthalene is led over a catalyst of magnesium oxide which has been coated with lustrous carbon by treatment with ethylene at 700° C. and which is contained in a tube of manganese-copper at 725° C., the amount of vaporized benzylnaphthalene in grams per hour being twice the number of cubic-centimetres of the volume of that part of the tube which is heated at the reaction temperature disregarding the volume of the catalyst ($D=2V$). At the same time a stream of carbon dioxide is led into the tube in an amount equal to the volume of the vaporized alpha-benzylnaphthalene. The vapors leaving the tube are cooled, a condensate thus being separated. The effluent carbon dioxide together with the hydrogen formed during the dehydrogenation is led through a receiver cooled with ice or through a washer charged with warmed alpha-benzylnaphthalene in order to recover the conversion products still contained therein.

The condensate is subjected to a fractional distillation under a pressure of 4 millimetres; in this manner a first running of benzene, toluene, naphthalene and homologues thereof and unchanged alpha-benzylnaphthalene is obtained and then at from 200° to 220 C. benzanthrene and dihydrobenzanthrene.

A pitch-like residue remains from which small amounts of benzanthrene may be recovered by treatment with superheated steam under reduced pressure. The unconverted alpha-benzylnaphthalene is supplied again to the reaction tube.

The amount of benzylnaphthalene converted by a single passage through the tube is about 82 per cent, of which about 58 per cent consists of benzanthrene and dihydrobenzanthrene and the remaining 24 per cent of cleavage products and higher condensation products, mainly dibenzanthrenes. The total yield of benzanthrene and dihydrobenzanthrene, calculated with reference to the benzylnaphthalene converted, thus amounts to about 71 per cent. The catalyst has an unlimited life; moreover, by reason of its good thermal conductivity it effects a uniform heating of the reaction space and thus prevents overheating and the deposition of carbon black consequent thereon.

*Example 3*

A mixture of the vapors of alpha-benzylnaphthalene and of water in the ratio of 1:2 is led at 650° C. over a catalyst situated in a porcelain tube and consisting of 50 per cent by weight of zinc oxide, 40 per cent of aluminium oxide and 10 per cent of calcium oxide, the throughput of benzylnaphthalene in grams per hour corresponding to about one eighth of the number of cubic centimetres of the volume of that part of the reaction tube which is heated to the reaction temperature disregarding the volume of the catalyst ($D=\frac{1}{8}V$). The vapors leaving the tube are cooled. The resulting condensate is separated from water and worked up in the manner described in Example 1. In addition to cleavage products, benzanthrene and dihydrobenzanthrene are obtained in excellent yields. The unconverted benzylnaphthalene is returned to the tube.

What we claim is:—

1. A process for the production of benzanthrene which comprises passing alpha-benzylnaphthalene through a reaction space kept at a temperature between about 650 and about 800° C., while maintaining a definite throughput (D) of alpha-benzylnaphthalene in grams per hour which amounts to from 1 to 4 times a minimum throughput ($D_{min}$) which satisfies the following equation in its dependence on the reaction space (V) in cubic centimetres heated to the reaction temperature ($t$) in degrees centigrade:

$$D_{min}=\frac{V}{16} \cdot 2^{\frac{t-650}{25}}.$$

2. A process as claimed in claim 1 in which a dehydrogenating catalyst is disposed in the reaction space.

3. A process as claimed in claim 1 in which the alpha-benzylnaphthalene is diluted by an inert gas or vapor.

4. A process for the production of benzanthrene which comprises passing alpha-benzylnaphthalene diluted with an inert gas or vapor through a reaction space kept at a temperature between about 650° and about 800° C., in which a dehydrogenating catalyst is disposed, while maintaining a definite throughput (D) of alpha-benzylnaphthalene in grams per hour which amounts to from 1 to 4 times a minimum throughput ($D_{min}$) which satisfies the following equation in its dependence on the reaction space (V) in cubic centimetres heated to the reaction temperature ($t$) in degrees centigrade:

$$D_{min}=\frac{V}{16} \cdot 2^{\frac{t-650}{25}}.$$

CARL WULFF.
ERNST ROELL.
ARTUR KRAUSE.